(12) United States Patent
Vorsteher et al.

(10) Patent No.: US 7,032,743 B2
(45) Date of Patent: Apr. 25, 2006

(54) CONVEYOR PAN

(75) Inventors: Dirk Vorsteher, Bielefeld (DE); Gerhard Merten, Lunen (DE); Frank Fischer, Lunen (DE); Jorg Wirtz, Hattingen (DE); Siefgried Schmidt, Bottrop (DE); Martin Broszat, Nordkirchen (DE); Alfred Hefferan, Venetia, PA (US); John Cobley, Farnsfield (GB); Alister McAndrew, Belper (GB); Olaf Losbrodt, Herne (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 10/438,583

(22) Filed: May 15, 2003

(65) Prior Publication Data
US 2003/0213676 A1 Nov. 20, 2003

(30) Foreign Application Priority Data
May 17, 2002 (DE) .............................. 102 22 598

(51) Int. Cl.
*B65G 19/28* (2006.01)
(52) U.S. Cl. .................................. 198/735.1
(58) Field of Classification Search ... 198/735.1–735.6
See application file for complete search history.

(56) References Cited
U.S. PATENT DOCUMENTS
3,944,061 A * 3/1976 Braun et al. ............. 198/735.2
3,946,860 A * 3/1976 Krohm et al. ........... 198/735.6
4,667,811 A * 5/1987 Schoop et al. ........... 198/735.3
5,871,261 A * 2/1999 Bandy et al. .................. 299/43

FOREIGN PATENT DOCUMENTS
DE      4023873 A1 * 2/1992
GB      2095195 A  * 9/1982
GB      2 172 564 A   9/1986
WO      WO 92/07780 A1  5/1992

* cited by examiner

*Primary Examiner*—Gene O. Crawford
*Assistant Examiner*—Mark A. Deuble
(74) *Attorney, Agent, or Firm*—Cook, Alex, McFarron, Manzo, Cummings & Mehler, Ltd.

(57) ABSTRACT

The invention relates to a conveyor pan (150) for underground face and gate conveyors, with a bottom run (102) and a top run (103) for the guidance of a scraper of a scraper chain, with a frame work construction (101) which has side walls (110) comprising cast parts firmly joined to each other, with an intermediate flange (111) and an upper moulded flange lug (112) extending outwards from it and a lower moulded flange arm (113) as well as a moulded foot flange (120) extending inwards and bordering the bottom run partly to the side. In accordance with the present invention the cast part (110) has at least one step (115) on the inner wall (114) of the intermediate flange (111) for supporting and welding on a plate (105B) forming an intermediate plate, below which the intermediate arm (111) and the flange lug (120) form a profile strengthening (149), and above which the intermediate arm (131) borders to the side an accepting space for the acceptance of an exchangeable tray (104) having rolled side profiles (180) welded to a conveyor base (184).

28 Claims, 3 Drawing Sheets

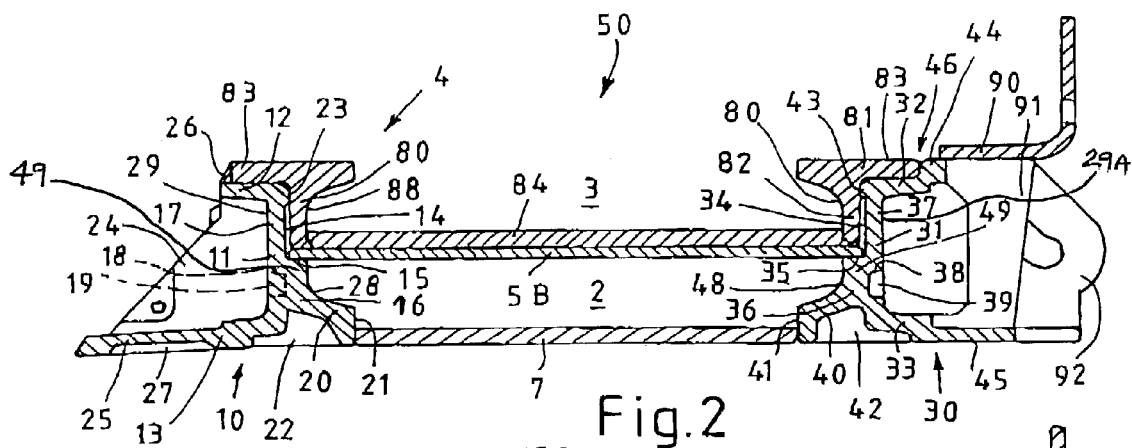
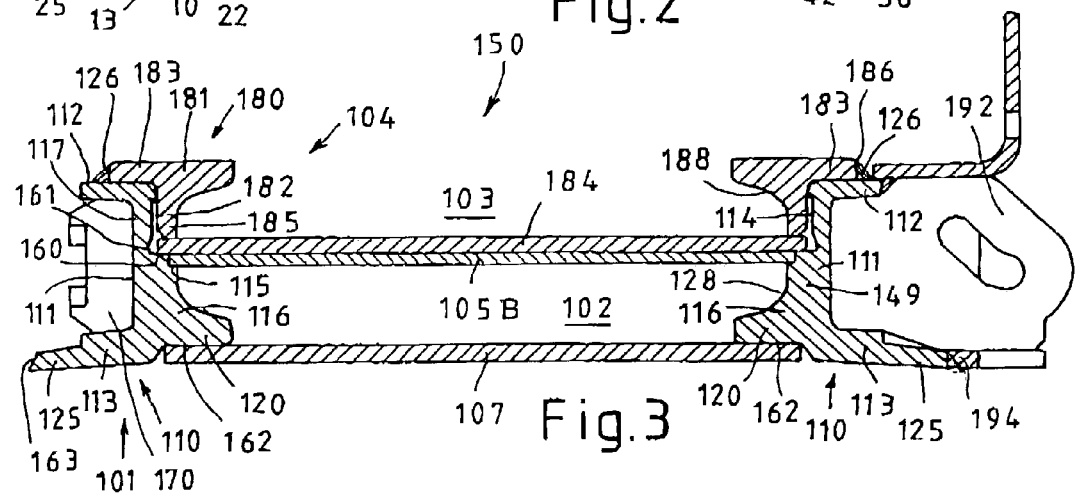
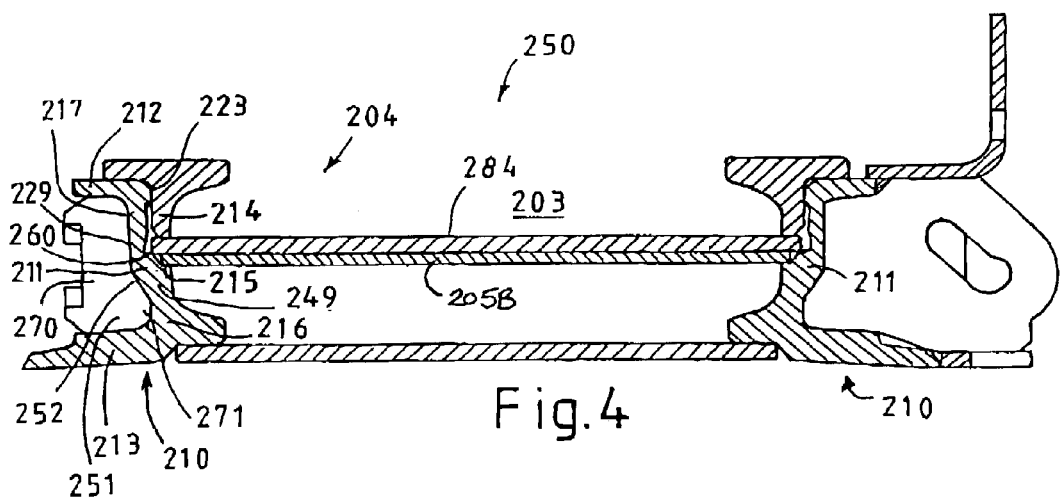

CONVEYOR PAN

The present invention relates to a conveyor pan for underground face and gate conveyors, with asymmetric side walls comprising cast parts joined together by a plate welded onto intermediate flanges, which comprise an upper cast flange lug extending back towards the outside from the intermediate flange and a lower cast flange arm and a cast foot flange extending inwards partly bordering a bottom run for the guidance of a scraper of a scraper chain, onto which a bottom plate is welded which closes the bottom run to below.

In previously proposed underground extraction installations such as for instance underground mining operations, chain scraper conveyors with large overall length come into application, which are put together from individual conveyor pans joined together in tension. The connection of the adjacent conveyor pans which are joined to each other is effected for instance using toggle pockets and toggles, which permit a certain angular mobility in the horizontal and the vertical axes of the adjacent conveyor pans, so that the chain scraper conveyor can smooth out unevennesses in the ground and can move together with the advance of the extraction front. Where the conveyor pans are applied for face conveyors they are provided on the spoil side and/or on the extraction side with built on parts for the guidance of for instance an extraction plough or a shearer loader and have connecting brackets for an advancing beam abutting the mining face. Owing to improvements in the mining performance of extraction machines and the increase of the face lengths in the meantime up to 450 m the conveyor performance to be provided by the conveyors increases similarly and modern face and gate conveyors must be able to cope with conveyor capacities of at least 2000 t/h (tonnes/hour) with high performance conveyors even of 5000 t/h. With increasing conveyor capacity the wear on the individual conveyor pans necessarily must increase and in the market there is a need for conveyor pans with a higher conveying capacity and longer lifetime with the lowest possible production costs and the lowest overall weight for the individual conveyor pans Previously proposed underground face and gate conveyors can be divided into three groups according to the construction of the conveyor pans. The first group includes conveyors with completely cast conveyor pans. The advantage of such cast construction lies in its high reproducibility, high loading capability owing to their homogeneous construction and their low liability to assembly failures. Disadvantages include high material costs, low adaptability for the design of individual zones to cater for higher loading or longer lifetime and the lack of the possibility of replacing worn parts.

The second group of conveyor pans comprises completely or almost completely of welded construction, whereby at least the more highly loaded parts such as conveyor base and/or side profiles comprise rolled profiles and have thereby a significantly longer life and low susceptibility to wear as proposed in DE-A-29 18 007, DE-C-974 612, DE-C-393 38 84 and DE-C-400 61 83. An advantage of welded conveyor pans is that a long lifetime can be achieved by the choice of different materials and production methods for the individual parts of the welded construction. Faults affecting the dimensional stability of individual parts of the welded construction can be evened out during the assembly process, i.e. in the application of the welded connections. Disadvantages have included high manufacturing costs which can be attributed to the multiplicity of assembly stages and welded connections to be undertaken, with high personnel costs, the danger of faults or cracks forming in the welded connections and the high tool costs for the tools required for the rolling of the profile parts. The conveyor pans in this second group can hold their own in the market since by the exchange of worn out parts at comparatively favourable costs, the entire functional capability of the conveyor can be restored. The top tray comes especially into consideration, which can be constructed as an exchangeable tray or wearing tray.

The third group comprises so-called hybrid pans, which on the one hand comprise cast parts and on the other hand rolled parts. A hybrid pan of this construction is proposed in EP-B-0 525 926. Hybrid pans can be made with a small number of welded joints, since for instance the entire construction of the side walls, possibly including the side profile for the guidance of the scrapers in the strands and the toggle pockets as a part of connecting means of the conveyor pans can be formed in one piece, whilst the conveyor base, as one of the highly loaded parts, is welded on to the cast side walls. Furthermore, it has been previously proposed in hybrid pans that the means for joining the conveyor pans and other built-on parts for the movement of the conveyor or for the guidance of an extraction machine can be arranged between flanges extending out from the side walls and welded on retrospectively as is proposed in DE-A-39 05 324.

It is an aim of the invention to produce a conveyor pan which owing to its constructional form can be produced cost effectively with low overall weight and with fewer assembly stages than a previously proposed conveyor pan and which has a longer lifetime.

Accordingly, the present invention is directed to a conveyor pan as described in the opening paragraph of this present specification wherein the cast parts forming the side walls have at least one step for the support and welding on of a sheet forming an intermediate plate on an inner wall of the intermediate flange, essentially at half the height between the flange arm and the flange lug, below which an intermediate arm and the foot flange form a strengthening of a profile, and above which the intermediate arm borders to its side an accepting space for the acceptance of a top run with a rolled side profile welded to a conveyor base. In accordance with the invention the side walls are formed from cast parts, so that they can be produced more cost effectively than, for instance, specially rolled profiles. The profile shape of the side walls with flange arms and flange lug on the outer wall and steps on the inside make it possible that functional and attachment parts can be applied and accepted at least partly in positive engagement. This simplifies the necessary assembly stages and eases the application of welded seams. More highly loaded parts in the top run can comprise rolled parts and consequently have a longer lifetime. The joining of the side walls occurs somewhat in the centre between the bottom run and the top run, however by means of an additional intermediate plate not forming the conveyor base this region is strengthened by increasing the thickness of the profiles in the cast parts. The bottom run is less loaded and its borders to the sides are integrated immediately into the cast side walls. The conveyor pan comprises few parts and can be put together by means of automated assembly and welding stages.

Preferably, the intermediate arm has a second step on its inner wall to support the conveyor base, which is formed above the first step, which serves to support the intermediate plate. Resulting from these measures the conveyor base and all the forces acting in the vertical direction are supported not by means of the intermediate plate, but by means of the steps within the cast side walls.

Advantageously, the intermediate arm has an arm section above the step(s) and an arm section below the step(s), whereby the thickness of a wall of the upper arm intermediate section is more than 30%, and preferably more than 50% less than the wall thickness of the lower arm intermediate section in the area of the profile strengthening, so as to keep the overall weight of the conveyor pan low and to match the construction of the cast parts to the anticipated loadings.

In a preferred embodiment, the top run is formed from an exchangeable tray, whose side profiles and conveyor base are provided with a wearing or consumable layer in their wall thickness.

Preferably, these side profiles comprise rolled profiles or rolled parts.

Advantageously, the side profiles are essentially L-shaped or T-shaped and have an inner side matched to the profile shape of the scrapers.

In an alternative embodiment, the conveyor base extends out to the sides beyond vertical arms of the side profiles of the exchangeable tray and its inner sides and is supported on the second step.

Alternatively, the conveyor base is welded in between the vertical arms of the side profiles of the exchangeable tray, and the exchangeable tray is then supported using feet of the vertical arms of the side profiles, immediately on the intermediate plate.

Advantageously a cast in nose is formed on an inner wall of the upper intermediate arm section at the height of the flange lug, which in the assembled condition forms the only abutment surface and side fixing for the exchangeable tray.

In a preferred embodiment, the flange arm extends outwards beyond the flange lug and forms an abutment foot on the ground.

Preferably, the lower intermediate arm is provided with a chamfer of some 60° on its outer wall below the steps and the chamfer, the lower intermediate arm section and a top wall of the flange arm form and border a cut-out for the support and acceptance in positive engagement of corresponding protrusions on a means for joining conveyor pans and connecting brackets for advancing beams. The acceptance and matching in positive engagement of the means of joining the conveyor pans and the connecting brackets does not only have production engineering advantages, but after their assembly and welding, the side walls constructed from cast parts, are additionally supported and stiffened between the flange lug and the flange arm as well as below the step(s), so that the side walls can accept possibly even greater forces and loads applied by an extraction machine guided on the conveyor pan.

Advantageously, weight reducing depressions stiffened by cast web ribs, are provided in an outer wall of the lower intermediate arm sections an underside of the flange arm and in a base wall of the foot flange and in other suitable positions to reduce the overall weight of the conveyor pan.

In a preferred embodiment the side walls differ from each other in shape, whereby on one side wall, on a spoil side of a face conveyor, an attachment bracket is cast on for an advancing beam and on the other side wall, on a face side at least two support ribs are cast.

Preferably, vertically extending support webs are cast on the side wall on the spoil side to support a spoil side machine track, an angle plate or similar.

Advantageously, the cast or welded on connecting brackets and the cast supporting ribs stiffen the flange lug opposite the flange arm to the side of and parallel to the intermediate flange. The two side walls may preferably be formed identically to each other and welded to each other as mirror images via the intermediate plate.

In an advantageous embodiment a long cut-out is cast below the foot flange, onto which a base plate is welded, engaging beneath the foot flange.

Preferably, the foot flange has a vertical front surface reaching almost to the ground, whereby the base plate is welded between the front surfaces of the foot flanges of both side walls.

Advantageously the lower intermediate arm section makes a transition from a profile thickening, via a curved shaped profile contour on its inner wall into the foot flange, so as to form a sideways limit for the bottom run.

In a preferred embodiment two metal strips arranged parallel to each other leaving an opening between themselves form the intermediate plate. These metal strips can be welded to the lower step on the intermediate arm. The opening between the two metal strips reduces the overall weight of the conveyor pan and at the same time makes it possible that following the disassembly of an exchangeable tray, or of an exchangeable tray configured as an inspection tray, an inspection opening is present for the bottom run.

In a preferred embodiment, the exchangeable tray has essentially T-shaped wide profiles which include horizontal webs, which are welded to the flange lugs of the side walls using a single continuous long welded seam as a retaining means for the exchangeable tray.

Advantageously, the exchangeable tray has L-shaped side profiles each with a vertical web and a horizontal web where the exchangeable tray is welded using a single continuous long welded seam as a retaining means for the exchangeable tray at a gap between the side profile and the side walls, whereby the horizontal webs end in a binding manner with associated flange lugs of the side walls. This could be employed for instance to maintain a large area machine track. Owing to the fixed welding of the exchangeable tray to the side walls many of the disadvantages, which are present with removable fastening means for exchangeable trays, are avoided.

Preferably, for the disassembly of the exchangeable tray the long welded seam is separated by machine, for instance it is milled out. Due to the constant construction both of the side walls and also the side profiles of the exchangeable tray over the length of the conveyor pan, not only is automated, machine welding and production of individual conveyor pans possible, but also the separation of welded seams and the exchange of an exchangeable tray can be effected by machine.

Advantageously, the metal strips forming the intermediate plate and the conveyor base are provided with curve-shaped ends produced by flame cutting, whereby the curved profile of one end is complementary to the curved profile of the other end.

In a preferred embodiment, the exchangeable tray is configured as an inspection tray and comprises three identically constructed tray sections each having a conveyor base section and two essentially L-shaped or T-shaped side profile sections with vertical arms and horizontal arms, whereby in the two outer tray sections their horizontal arms are each welded to the inner walls of the side walls and to the noses arranged there and to the outer end edges of a horizontal web on the horizontal arm with an upper side of the flange lug, using a long welded seam, and the centre tray section is retained by using removable tray fastening means onto the two other tray sections and to the cast parts forming the side walls.

Preferably the conveyor base sections of all the tray sections are provided with curved edges produced by flame cutting, whereby a curved profile of one edge is formed complementary to that of another edge.

Advantageously, one of the metal strips on the end of the conveyor pan extends out over both side walls and the other strip is arranged set back from the end of the conveyor pan. With these measures overlapping arises at the abutment of the pan such that finer material cannot fall from the top pan into the bottom pan.

Preferably the conveyor pan joining means comprises forged toggle pockets welded onto the side walls in which the toggle heads of toggle bolts can be inserted and the toggle pockets extend out over the side walls at one end of the conveyor pan and at the other end of the conveyor pan are set back. This overlapping of the toggle pockets at the joint of the conveyor pans between two adjacent conveyor pans avoids fatigue wear or breakouts at the face ends of the rolled profiles and/or of the conveyor base.

Preferably, the toggle pockets are cast integrally into the side walls, which comprise cast parts.

Advantageously, in a face side side-wall of a face conveyor the upper flange lug is formed exclusively in the region of the welded on toggle pockets and these side walls are strengthened by means of ribs or similar cast onto the outer wall, whereby the ribs can be provided with a cut-out into which a lever can engage for lifting the conveyor pan.

Examples of conveyor pans made in accordance with the present invention will now be explained with reference to the accompanying drawings, in which:

FIG. 2 shows a cross-sectional view through a conveyor pan in accordance with the first embodiment;

FIG. 3 shows a cross-sectional view through a conveyor pan made in accordance with a second embodiment;

FIG. 4 shows a cross-sectional view through a conveyor pan made in accordance with a third embodiment;

Figure 1:
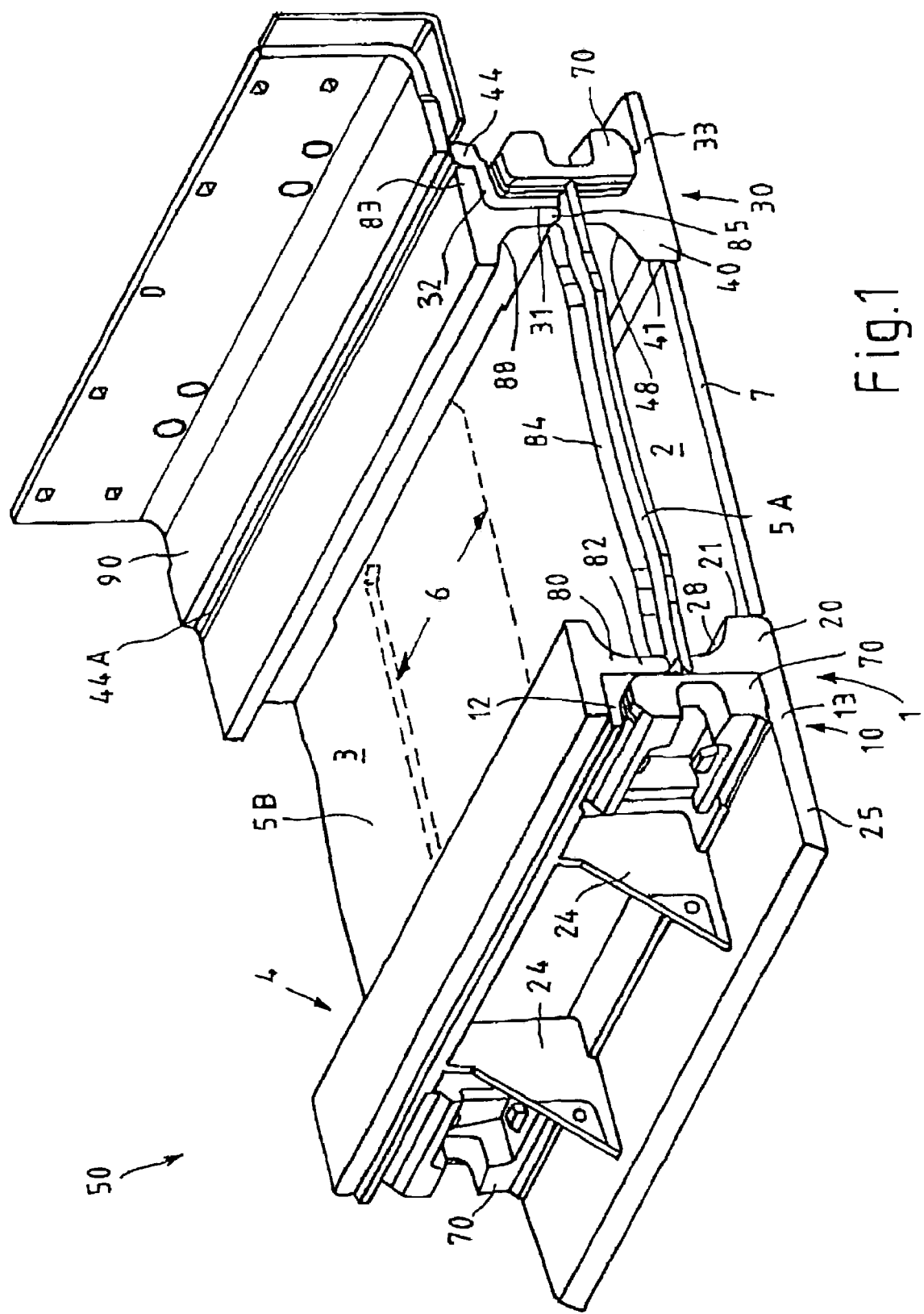
FIG. 1 shows a perspective view of a conveyor pan according to a first embodiment of the invention.

A conveyor pan 50 is shown in FIG. 1 and FIG. 2 in the configuration for an underground face conveyor and has a framework construction 1 immediately bordering the bottom run 2 and an exchangeable or consumable tray 4 forming the top run 3, supported on the framework construction 1. The exchangeable tray 4, shown in the assembled condition, can he lifted vertically from the framework construction 1. The framework construction 1 of the conveyor pan 50 has two differently constructed side walls 10, 30, asymmetrical in themselves and comprising cast parts, of which the side wall 10 is arranged in a face conveyor on the face side, and the side wall 30 is arranged on the spoil side. Both side walls 10, 30 have an intermediate flange 11, 31, an upper, outward facing flange extension 12, 32, cast on to the intermediate flange 11, 31, and a lower cast flange arm 13, 33 extending outwards. The side walls 10, 30, constructed differently from each other here, are firmly fixed to each other, via their flange extensions 12, 32 and flange arms 13, 33 facing outwards, by two metal strips 5A, 5B, welded onto the inner wall 14, 34 of the intermediate flange 11, 31 at about half height and shown schematically in FIG. 1, whereby the metal strips 5A, 5B are separated from each other and form an opening 6 within the conveyor pan 50, which can serve as an inspection opening with the exchangeable tray 4 removed, for the revision or inspection of a scraper chain, not shown, circulating in the bottom run 2 and fitted with scrapers. The metal strips 5A, 5B forming an intermediate plate for the stiffening of the framework construction 1 are supported on a step 15, 35, which is cast into the inner wall 14, 34 of the intermediate flange 11, 31 of the side walls 10, 30. Below the steps 15, 35 the arm section 16 and 36 forms, by an increased wall thickness, a massive profile strengthening 49 of the side walls 10, 30 in order to support the exchangeable tray 4 supported on it with the required security. The arm section 17, 37 of the intermediate flange 11, 31 is designed to be noticeably smaller in its wall thickness, especially 50% thinner than its lower arm section 16 and 36. The upper arm sections 17, 37 border the acceptance space for the exchangeable tray 4, at the sides. To reduce the overall weight of the side walls 10, 30, which comprise cast parts it is possible to form waists 18, 38 in the lower arm sections 16 and 36 respectively, which are stiffened by web ribs 19, 39 in the vertical direction.

On each lower arm sections 16, 36 is cast a foot flange 20, 40, extending to the inside, which ends in each case in a vertically running end surface 21, 41, between which a base plate 7 is welded on as the lower limit of the bottom run 2. As shown in FIG. 2 the undersides of the foot flanges 20, 40 of both side walls 10, 30 are provided in each case with further weight reducing waists strengthened by web ribs 22 and 42. The inner sides 28, 48 of the foot flanges 20, 40 facing inwards or obliquely upwards, and of the lower arm sections 16, 36 of the side walls 10, 30 are formed with a contour as provided on the profile shape of the scraper ends, so that the scrapers lead in the bottom run 2 immediately on the inner sides 28, 48 of the lower profile arms 16, 36 or the foot legs 20, 40. Both upper arm sections 17, 37 of the intermediate flanges 11, 31 have, at about the height of the flange extension 12 and 32 respectively, a cast nose 23, 43, extending over the whole length of the conveyor pan 50, which forms the only side fixing for the essentially T-shaped side profiles 80, comprising rolled profiles, of the exchangeable tray 4.

The side wall 10 on the working face side has, as distinct from the side wall 30 on the spoil side, two supporting ribs 24 between the lower flange arm 13 and the upper, relatively short flange extension 12, which ribs 24 extend at an angle downwards and outwards and are engaged from below by an extension of the flange arm 25, which extends outwards somewhat beyond the flange extension 12. The underside of the flange arm 25 can be provided with further weight reducing depressions, stiffened by web ribs 27 and is slightly angled down towards the base plate 7 against the horizontal and lies during the operation of the face conveyor, as an abutment foot on the underground floor. On the other hand, corresponding web ribs are not cast into the side wall 30, but an angle rail 90, onto which for instance the drive shaft of a shearer loader can be fastened, is supported by means of several vertically extending support plates 91 cast into the side wall 30. The upper flange extension 32 of the side wall 30 has a strong cast in rail 44 matched in height to the thickness of the horizontal arm 81 of the side profile 80, forming also its outer end, which forms a step extension together with the upper side of the flange extension 32, on which the horizontal arm 81 of the side profile 80 an the spoil side is supported by a web 83 extending horizontally towards the outside over the vertical arm 82. The surface of the rail 44 facing towards the interior of the top run 3 is provided with a chamfer 44A, so as to join the exchangeable tray 4 and the side wall 30 with a continuous long welded seam 46, as is shown in FIG. 2. In a similar manner the horizontal web 83 of the side profile 80 on the working face side is joined to the upper side of the arm extension 12 of the side wall 10 by the welded seam 26.

The flange arm extension 45 on the flange arm 33 of the side wall 30 on the spoil side runs flatter than the flange arm extension 25 on the opposite side wall 10, and is shorter than it and because of its lesser height is made without depressions. Between the flange arm 33 and the flange extension 32 of the side wall 30 a connecting bracket 92 can be cast in or welded on, onto which an advancing beam for moving a face conveyor can be connected.

The intermediate flange 11, 31 forms together with the flange arms 13, 33 and flange extensions 12, 32 an almost U-shaped profile pocket for the positive engagement of four toggle pockets 70 as the means of joining conveyor pans, which can be inserted and welded in between the underside of the flange extensions 12, 32, of the outer wall 29, 29A of the intermediate flange 11, 31 vertically directed over its entire height and the top side of the flange arm 13, 33; the U-shaped profile pockets of both side walls 10, 30 have the same dimensions. The forged toggle pockets 70 are arranged on the conveyor pan 50 such that on one conveyor pan end, as shown in FIG. 1 at the forward conveyor pan end, the two toggle pockets 70 extend out beyond the end of the conveyor pan 50 towards the outside, especially beyond the cast side walls 10, 30, whilst those on the other as shown in FIG. 1 at the rear conveyor pan end are set back relative to the side walls 10, 30 so that an overlapping of the toggle pockets 70 arises relative to the side walls 10, 30. In a similar manner the intermediate plate 5A also extends out over the conveyor base 84 and the side walls 10, 30, whilst the outer edge of the rear metal strip 5B is arranged to be set back.

In the conveyor pan 50 the exchangeable tray 4 is constructed such that the conveyor base 84 comprising a rolled sheet is welded in between the vertical arms 62 of the rolled side profiles 80. Hereby the exchangeable tray 4 is made comparatively wide, especially if the vertical arm 82 and the horizontal arm 81 of the side profile 80 are provided with a wearing layer several millimetres thick, which can be consumed before the exchange of the exchangeable tray 4, without limiting the functional effectiveness of the conveyor pan 50. The inner side 88 of the side profile is matched in its contour to the profile form of the scraper of the scraper chain. Owing to the constructional principle of the exchangeable tray 4 with the conveyor base 84 welded on between the vertical arms 82, the foot 85 of each vertical arm 82 is supported immediately on the intermediate plate 5A or 5B respectively. Between the lower arm section 16, 36 and the upper arm section 17, 37 of the side walls 10, 30 only a single step 15, 35 is therefore formed which forms a comparatively large abutment surface for the edge strips of the metal strips 5A, 5B. The conveyor pan end edges of the conveyor base 84 are formed in a curve, whereby one edge is constructed to be complementary to the other edge so that in a face or gate conveyor put together from several conveyor pans 50 the scraper can overrun the abutment positions between two conveyor pans 50 relatively noiselessly.

FIG. 3 shows a second embodiment of a conveyor pan 150 made in accordance with the present invention with a frame construction 101, which comprises two identically formed side walls 110, which again are welded to each other on their inner walls via two metal strips of which only the metal strip 105B is shown. The cast side walls 110 include an intermediate flange 111 an upper flange extension 112 and a lower flange arm 113, whereby the intermediate flange 111 has, above a thickening 149 of the profile in the lower arm section 116, a cast in double step with a lower step 115 and an upper step 160; the steps 115, 160 are supported by the lower arm section 116 which is strong and in its wall thickness more than double the thickness of the upper arm section 117. The intermediate plate 105B is welded in each case onto the lower step 115, whilst the conveyor base 184 of the exchangeable tray 104 is supported on the upper step 160. Immediately above the step 160 the intermediate flange 111 has its lowest wall thickness and is there provided with a groove 161. On the lower arm section 116 a foot flange 120 is cast in each case and the foot flange 120 and the lower arm sections 116 are provided with a curved profile matched to the ends of the scrapers, so that the scrapers can be guided on their inner sides in the bottom run 102 immediately at the sides in the side walls 110. On the underside of the toot flange 120 in each case a longitudinal cut out 162 is cast in, onto which the base plate 107 engaging in each case below the foot flange 120 can be welded on, closing the bottom run 102 at the bottom. In the side walls 110 of the conveyor pan 150 also weight-reducing depressions can be provided in the casting. Since preferably both side walls 110 are formed identically to each other, both flange arms 113 have a comparatively short flange arm extension 125 which extends only a small amount outwards past the flange extension 112. The front edge 163 of the flange arm extension 125 is constructed as an angled surface, in order to be able to weld on built on parts such as a roller track or a supporting rail 194 for a connecting bracket 192 welded to the side walls 110. In the exchangeable tray 104 the foot end 185 of the vertical arm 182 of the side profile 180 is welded to the upper side of the conveyor base 184. The side profiles 180 are overall almost T-shaped and the horizontal arm 181 has a horizontal web 183 extending out towards the outside past the vertical arm 182, whose outer face edge 186 is joined by a continuous long welded seam 126 with the upper side of the flange extension 112 of the side wall 110 as the retaining means for the exchangeable tray 104. All long welded seams for binding the metal strips 105B to the side walls 110 and the side profiles 180 of the exchangeable tray 104 with the flange extension 112 are accessible from above and can be carried out by means of a welding robot. In the U-shaped profile pockets on the outer wall of the side walls 110 there are again preferably forged toggle pockets 170 inserted in positive engagement and welded with a few welded joints, which similarly can be undertaken using a welding robot.

In the third embodiment of a conveyor pan 250 made in accordance with the present invention as shown in FIG. 4 two identically constructed side walls 210 comprising cast parts are joined to each other via the metal strips 2053 of an intermediate plate, which is supported in a step 215 on the intermediate flange 211 of the sidewalls 210. The upper arm section 217 and the upper flange extension 212 are made identically to that in the embodiment according to FIG. 2. The inner wall of the upper arm section 217 which together with the intermediate plate limits the accepting space for the exchangeable tray 204 has a nose 223 which forms a fixing at the side for the upper run 203 comprising the exchangeable tray 204. The conveyor base 284 of the exchangeable tray 204 is supported on an upper step 260 on the inner wall 214 of the intermediate flange 211. In contrast to the embodiment according to FIG. 3 the outer wall 229 of the intermediate flange 211 does not run straight and vertical but the lower arm section 216 tapers by an incline 252 beginning at the height of the lower step 215 and directed towards the inside, as a result of which a depression 251 arises below the profile thickening 249 on the lower arm section 216. Owing to the depression 251 the weight of the two side walls 210 is reduced. So as nevertheless to be able to accept high loadings in the vertical direction, the forged toggle pockets 270 welded in between the flange extension 212 and the lower flange arm 213 on the conveyor pan end side have in each case a swelling 271, which fits the profile shape of the depression 251 and fills this in a positive engagement.

Figure 5:
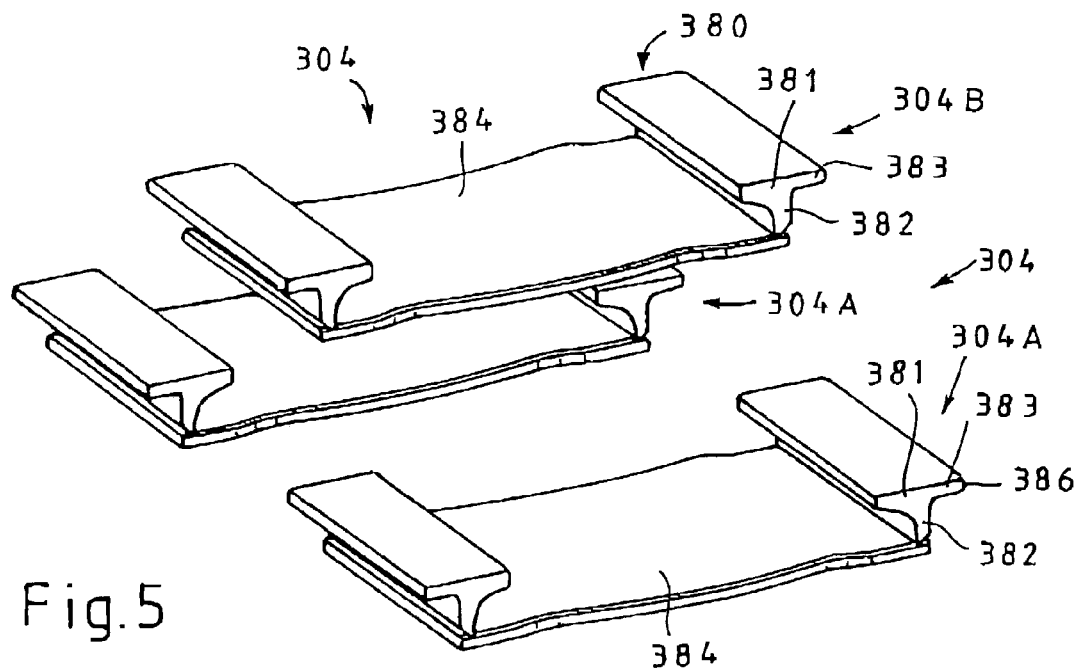
FIG. 5 shows a perspective view of an inspection tray formed in accordance with the present invention from three identical tray sections.
Figure 6:
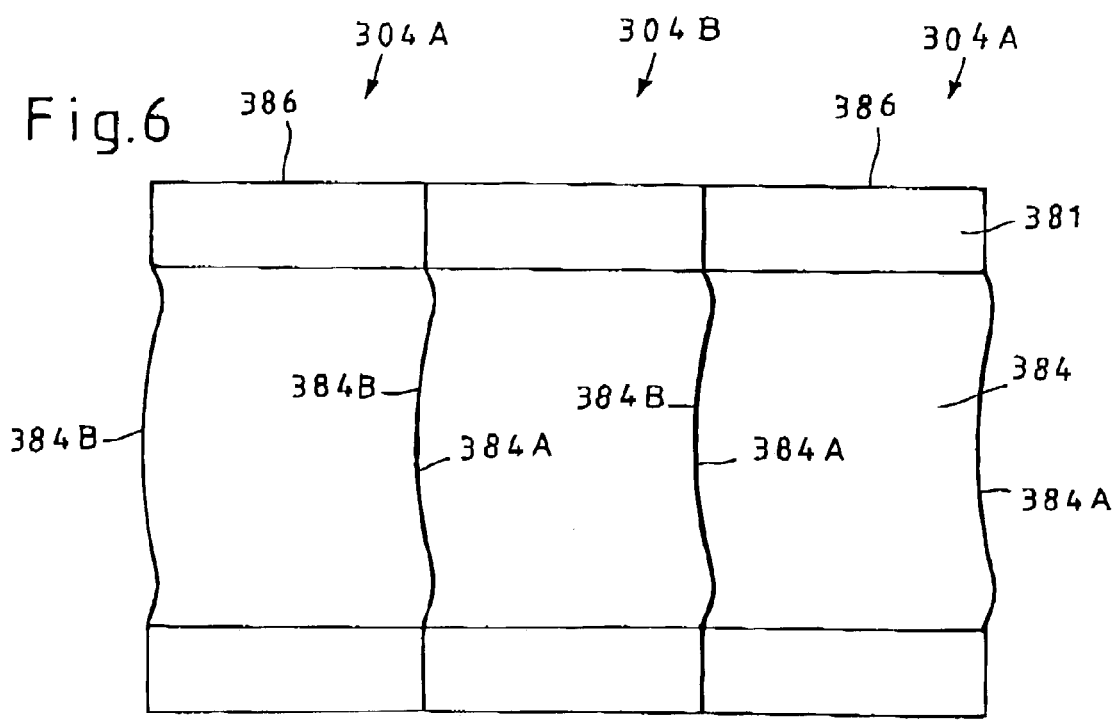
FIG. 6 shows a plan view on the inspection tray as shown in FIG. 5.

The inspection opening 6 between the metal strips 5A, 5B as shown in FIG. 1 offers special advantages in combination with an inspection tray 304 as an exchangeable tray as is shown in FIG. 5 and FIG. 6 The inspection tray 304 comprises three identically constructed tray sections 304A, 304B each with a conveyor base section 384 and two essentially here T-shaped side profile sections 380 with a vertical leg 382 and a horizontal arm 381 which has a horizontal web 383 extending out beyond the vertical leg 382. The profile of the side profile sections 380 is matched to the profile of the side profiles of the conveyor pan 50 according to FIGS. 1 to 4, consequently to the profile of the "normal" exchangeable tray 4. In the inspection tray 304 the outer front surfaces 386 of the horizontal webs 383 of the horizontal arm 381 of both outer tray sections 304A are welded using long welded seams to the upper side of the flange extension of the cast side profiles of the conveyor pan, whereby the length of the welding seams extends in each case over the length of the associated tray section 304A. The centre tray section 304B on the other hand is retained using tray fastening means, not shown, onto the two other tray sections 304A and/or to the side walls of the conveyor pan, so that it can be demounted for a short period for inspection of the scraper chain in the bottom run, in order to be able to reach the bottom run through the opening indicated in FIG. 1 between the metal strips 5A, 5B. As FIG. 6 clearly shows the conveyor base sections 384 of all the trays sections 304A, 304B are provided with curved edges 384A, 384B whereby the profile of the curve of the one edge 384A is complementary to that of the other edge 384B, so that the scraper of a scraper chain circulating in the top run can run across the abutment positions between the tray sections and the abutment positions to the following exchangeable tray quietly and without stepped positions to the following exchangeable tray.

For the man skilled in the art a series of modifications results from the foregoing description, which fall within the scope of the attached claims. The exchangeable tray as shown in FIG. 2 and FIG. 3 can be used also in a conveyor pan with differently constructed side walls according to FIG. 1. The embodiments of side profiles shown as T-shaped could also be L-shaped or angle shaped, whereby then the height of the side profile finishes in a joint with the upper side of the flange extension and/or the welded joint is applied in the gap between the intermediate flange and the vertical arm of the side profile. In the cast side walls further weight reducing depressions can be provided. Toggle pockets or retaining parts for toggle heads of the toggles joining conveyor pans can be cast integral in the side walls comprising cast parts and that in the working face side walls the upper flange extension can be formed exclusively in the region of the cast or welded on toggle pockets of the cast retaining parts. The cast side walls can have at least in the intermediate arm, the flange arm and the flange extension, a cross section extending constantly over the length of the conveyor pan.

The invention claimed is:

1. A conveyor pan, for underground face and gate conveyors, with asymmetrical side walls, comprising cast parts joined together by a plate welded onto intermediate arms which comprise an upper outwardly facing cast flange lug extending from the intermediate arm, a lower cast flange arm extending outwards, and a cast foot flange extending inwards, partly bordering a bottom run for the guidance of a scraper of a scraper chain, onto which a bottom plate is welded which closes the bottom run to below, in which at least one of the cast parts has at least one step on an inner wall of the intermediate arm, essentially at half the height between the lower flange arm and the upper flange lug for the support and welding on of a metal sheet forming an intermediate plate, beneath which the intermediate arm and the foot flange form a profile having a greater thickness than the upper intermediate arm and above which the intermediate arm borders to its side an accepting space for the acceptance of a top run having a rolled side profile welded to a conveyor base in which, the conveyor pan has an exchangeable tray with essentially T-shaped side profiles which include horizontal webs which are welded to the flange lugs of the side walls as a retaining means for the exchangeable tray.

2. A conveyor pan according to claim 1, in which the intermediate arm has a second step on its inner wall for the support of the conveyor base, which is formed above the first step for the support of the intermediate plate.

3. A conveyor pan according to claim 1, in which the intermediate arm has an arm section above the step(s) and an arm section below the step(s) whereby the thickness of a wall of the upper intermediate arm section is more than 30%, and more than 50% smaller than the wall thickness of the lower intermediate arm section in the range of the profile.

4. A conveyor pan according to claim 1, in which the top run is an exchangeable tray whose side profiles and conveyor base, are provided in the thickness of their wall with a wearing or consumable layer.

5. A conveyor pan according to claim 4, in which the side profiles of the exchangeable tray have an inner side matched to the profile shape of the scraper.

6. A conveyor pan according to claim 4, in which the conveyor base extends out to the sides beyond vertical arms of the side profiles of the exchangeable tray and their inner sides and is supported on a second step.

7. A conveyor pan according to claim 4, in which the conveyor base is welded in between vertical arms of the side profiles of the exchangeable tray, which is supported by feet of their vertical arms on the intermediate plate.

8. A conveyor pan according to claim 1, in which a cast in nose is formed on an inner wall of the upper intermediate arm section at the height of the flange lug.

9. A conveyor pan according to claim 1, in which the flange arm extends out wards beyond the flange lug and forms an abutment foot onto the ground.

10. A conveyor pan according to claim 1, in which a lower intermediate arm section is provided with a chamfer of some 60° on its outer wall below the step(s) and the chamfer, the lower intermediate arm section and a top wall of the flange arm form and border a cut-out for the positive support and acceptance of corresponding protrusions on a means for joining conveyor pans and a connecting bracket.

11. A conveyor pan according to claim 1, in which weight reducing depressions stiffened by cast web ribs are provided in an outer wall of a lower intermediate arm section, an underside of the flange arm and in a base wall of the foot flange.

12. A conveyor pan according to claim 1, in which side walls are constructed differently from each other, whereby on one side wall on a spoil side a connecting bracket for an advancing beam is cast in and on another side wall on a face side at least two supporting ribs are cast.

13. A conveyor pan according to claim 12, in which vertically extending support webs are cast on the side wall on the spoil side for support of a spoil side machine track or angle plate, or similar.

14. A conveyor pan according to claim 1, in which a cast or welded on connecting bracket and cast on supporting ribs stiffen the flange lug opposite the flange arm.

15. A conveyor pan according to claim 1, in which a longitudinal cut out is cast below the foot flange, onto which a bottom plate, engaging the foot flange from underneath, is welded on.

16. A conveyor pan according to claim 1, in which the foot flange has a vertical front surface reaching almost to the ground, whereby the base plate is welded between the front surfaces of the foot flanges of both side walls.

17. A conveyor pan according to claim 1, in which a lower intermediate arm section makes a transition from a profile thickening via a curve shaped profile contour on its inner wall into the foot flange.

18. A conveyor pan according to claim 1, in which two metal strips arranged parallel to each other leaving an opening between themselves form the intermediate plate.

19. A conveyor pan according to claim 18, in which one of the metal strips on the end of the conveyor pan extends out over both side walls and the other strip is arranged set back from the end of the conveyor pan.

20. A conveyor pan according to claim 1, in which the exchangeable tray is welded using a continuous long welded seam.

21. A conveyor pan according to claim 1, in which an exchangeable tray has side profiles each with a vertical web and a horizontal web where the exchangeable tray is welded using a single continuous long welded seam, as a retaining means for the exchangeable tray in a gap between the side profile and the side wall, whereby the horizontal webs end in a binding manner with associated flange lugs of the side walls.

22. A conveyor pan according to claim 20, in which for the disassembly of the exchangeable tray the long welded seam is separated by machine.

23. A conveyor pan according to claim 1, in which metal strips form the intermediate plate and the conveyor base are provided with curve shaped edges produced by flame cutting, whereby the profile of the curve of one edge is complementary to that of the other edge.

24. A conveyor pan according to claim 1, in which the exchangeable tray is configured as an inspection tray and comprises three identically constructed tray sections each having a conveyor base section and two essentially T-shaped side profile sections with vertical arms and horizontal arms, whereby in the two outer tray sections the horizontal arms are welded using a long welded seam to the inner walls of the side walls and to the noses on the side walls and to the outer edges of a horizontal web on the horizontal arm with an upper side of the flange lug and the centre tray section is retained by using removable tray fastening means onto the two other tray sections and to the cast parts forming the side walls.

25. A conveyor pan according to claim 24, in which the conveyor base sections of all the tray sections are provided with curved edges produced by flame cutting whereby a curve profile of one edge is formed complementary to that of another edge.

26. A conveyor pan according to claim 1, in which the conveyor pan joining means comprises forged toggle pockets welded onto the side walls in which the toggle heads of toggle bolts can be inserted and the toggle pockets extend out over the side walls at one end of the conveyor pan and at the other end of the conveyor pan are set back.

27. A conveyor pan according to claim 26, in which the toggle pockets are cast integrally into the side walls which comprise cast parts.

28. A conveyor pan according to claim 26, in which in a face side side-wall of a face conveyor the upper flange lug is formed exclusively in the region of the welded on toggle pockets and that this side wall is strengthened by means of cast in ribs.

* * * * *